Aug. 3, 1948.  L. W. MITCHELL  2,446,294
HIGH SPEED BELT
Filed Jan. 16, 1945

INVENTOR.
Lee W. Mitchell
BY Martin E. Anderson
attorney

Patented Aug. 3, 1948

2,446,294

UNITED STATES PATENT OFFICE 2,446,294

HIGH-SPEED BELT

Lee W. Mitchell, Denver, Colo., assignor to Gates Rubber Company, Denver, Colo., a corporation of Colorado Application January 16, 1945, Serial No. 573,083

2 Claims. (Cl. 74—232)

This invention relates to improvements in high speed belts.

In many types of machines and more especially in connection with high speed machinery such as textile manufacturing and grinding machines, the construction requires power to be transmitted by belts at a very high speed. For such power transmission strong but very flexible belts are necessary which are capable of transmitting the necessary power and also of flexing at a very high rate around comparatively small pulleys.

It is the object of this invention to produce a flat belt designed for very high speed power transmission and of a construction that makes it very flexible.

Briefly described, the belt consists of a central transversely flat core of cords wound spirally in the direction of the belt. This core is covered on either one or both sides with a knitted fabric and the several layers adhesively interconnected by rubber composition or some material having rubber-like properties.

Having thus briefly set forth the objects of the invention and in a general way its construction, the construction of the belt will now be described in greater detail and for this purpose reference will be had to the accompanying drawing in which the preferred construction of the belt has been illustrated, and in which.

The belt that forms the subject of this invention consists of a transversely flat layer 10 made from fiber cords wound helically in the direction of the belt. The cords may be of any suitable size and they are preferably arranged in a single layer, but may be composed of two layers of smaller cord, if desired. Arranged on one or both sides of the central cord layer is a covering 11 of knitted fabric.

Particular attention is called to the fact that the covering is knitted instead of woven, because such knitted fabric has been found to be more flexible than woven fabric and to give the belt a longer life.

Figure 3:
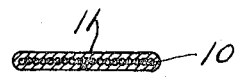
Figure 3 is a section taken on line 3—3, Figure 1, and shows a three-ply belt.
Figure 4:
Figure 4 is a transverse section of a modified form of belt showing a two-ply belt in which the knitted fabric is positioned on the inner surface of the belt.

In Figure 3 the knitted fabric covering has been shown as forming a complete envelope for the cord layer. In Figure 4, the knitted fabric has been shown as on the under or inside of the belt and in Figure 5 on the upper or outside of the belt. It is evident that by reversing a belt constructed in the manner shown in either Figures 4 or 5, the position of the knitted covering can be reversed with respect to the curvature of the belt so as to be either on the outside or on the inside.

The cords and the covering are adhesively interconnected by means of a rubber composition which may be either natural or artificial rubber, or some suitable plastic. Although in the description and in the claims this adhesive composition is referred to as rubber, it is to be understood that this term is used in a sense broad enough to cover any suitable mechanical equivalent. The rubber composition used for interconnecting the several layers is compounded and cured so as to produce a very flexible belt that will withstand a great number of bends without generating an undue amount of heat or causing the adhesive material to harden and crack.

Figure 1:
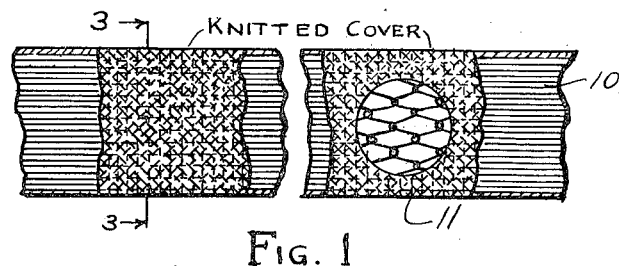
Figure 1 is a top plan view of a section of the belt showing the relationship of the parts, one portion has been shown magnified so as to more clearly disclose the construction.
Figure 2:
Figure 2 is a side elevation of the belt.

In Figure 1 a circular magnified area has been shown to indicate in a general way a knitted construction. It is to be understood, however, that any type of knitting found desirable or suitable can be used and that specific knitting shown is merely illustrative.

Figure 5:
Figure 5 is a section similar to that shown in Figure 4, and shows a belt in which the knitted fabric is on the outside of the cord layer.

From the magnified area in Figure 1 it will be seen that the knitting is quite loose providing meshes through which the adhesive will protrude thereby completely embedding the fabric in the rubber covering as shown in Figures 4 and 5.

Having described the invention what is claimed as new is:

1. A high speed belt comprising a transversely flat central core of cords wound helically in the direction of the length of the belt and a layer of knitted, longitudinally extensible fabric forming an outer surface of the belt, the core and the fabric layer being adhesively interconnected.

2. A high speed belt comprising a transversely flat tension core of cords wound helically in the direction of the length of the belt, and an enveloping covering of knitted, longitudinally extensible fabric, forming the outer surface of the belt, the several layers being adhesively interconnected by a rubber composition.

LEE W. MITCHELL.

REFERENCES CITED

The following references are of record in the file of this patent:

UNITED STATES PATENTS

| Number | Name | Date |
| --- | --- | --- |
| 27,471 | Peatfield | Mar. 13, 1860 |
| 306,131 | Chase | Oct. 7, 1884 |
| 1,223,742 | Sloper | Apr. 24, 1917 |
| 1,373,457 | Smith | Apr. 5, 1921 |
| 2,112,525 | Foster | Mar. 29, 1938 |

FOREIGN PATENTS

| Number | Country | Date |
| --- | --- | --- |
| 28,578–30 | Australia | Dec. 22, 1930 |
| 335,357 | France | Nov. 26, 1903 |